United States Patent [19]
Stoll et al.

[11] Patent Number: 5,496,067
[45] Date of Patent: Mar. 5, 1996

[54] CHASSIS FOR VEHICLES NOTABLY FOR MOTOR VEHICLES

[75] Inventors: Daniel Stoll, Neuchâtel; Jacques Müller, Reconvilier, both of Switzerland

[73] Assignee: SMH Management Services AG, Biel, Switzerland

[21] Appl. No.: 306,445

[22] Filed: Sep. 19, 1994

[30] Foreign Application Priority Data

Oct. 5, 1993 [FR] France .................... 93 11940

[51] Int. Cl.⁶ .................................. B62D 21/15
[52] U.S. Cl. .................... 280/784; 280/781; 280/783; 280/792
[58] Field of Search .................. 280/784, 781, 280/783, 800, 788, 789, 792

[56] References Cited

U.S. PATENT DOCUMENTS

| | | | |
|---|---|---|---|
| 2,192,075 | 2/1940 | Gregoire | 296/28 |
| 3,614,124 | 10/1971 | Schwabenlender | 280/800 |
| 3,940,162 | 2/1976 | Winslow et al. | 280/781 |
| 4,355,844 | 10/1982 | Muzzarelli | 280/784 |
| 4,573,707 | 3/1986 | Pabst | 280/792 |
| 4,907,735 | 3/1990 | Ushioda et al. | 280/800 |

FOREIGN PATENT DOCUMENTS

| | | | |
|---|---|---|---|
| 0217522 | 4/1987 | European Pat. Off. . | |
| 370342 | 5/1990 | European Pat. Off. | 280/781 |
| 0494116 | 7/1992 | European Pat. Off. . | |
| 0547583 | 6/1993 | European Pat. Off. . | |
| 854157 | 10/1952 | Germany | 280/784 |
| 4204825 | 6/1993 | Germany | 280/781 |
| 094863 | 7/1980 | Japan . | |
| 4189682 | 7/1992 | Japan | 280/781 |
| 5-65076 | 3/1993 | Japan | 280/781 |

OTHER PUBLICATIONS

Patent Abstracts of Japan vol. 4, No. 139 (M–34) (621) 30 Sep. 1980 & JP–A–55 094 863 (Mikio Kouyao 18 Jul. 1980.

*Primary Examiner*—Eric D. Culbreth
*Attorney, Agent, or Firm*—Griffin, Butler, Whisenhunt & Kurtossy

[57] ABSTRACT

A chassis for vehicles, notably for motor vehicles, is characterized in that it includes a rigid base frame 2 and two absorption zones 4, 6 at the front and the rear associated with the frame 2 and in that said frame 2 and the absorption zones 4, 6 have a cell-like unitary structure.

13 Claims, 2 Drawing Sheets

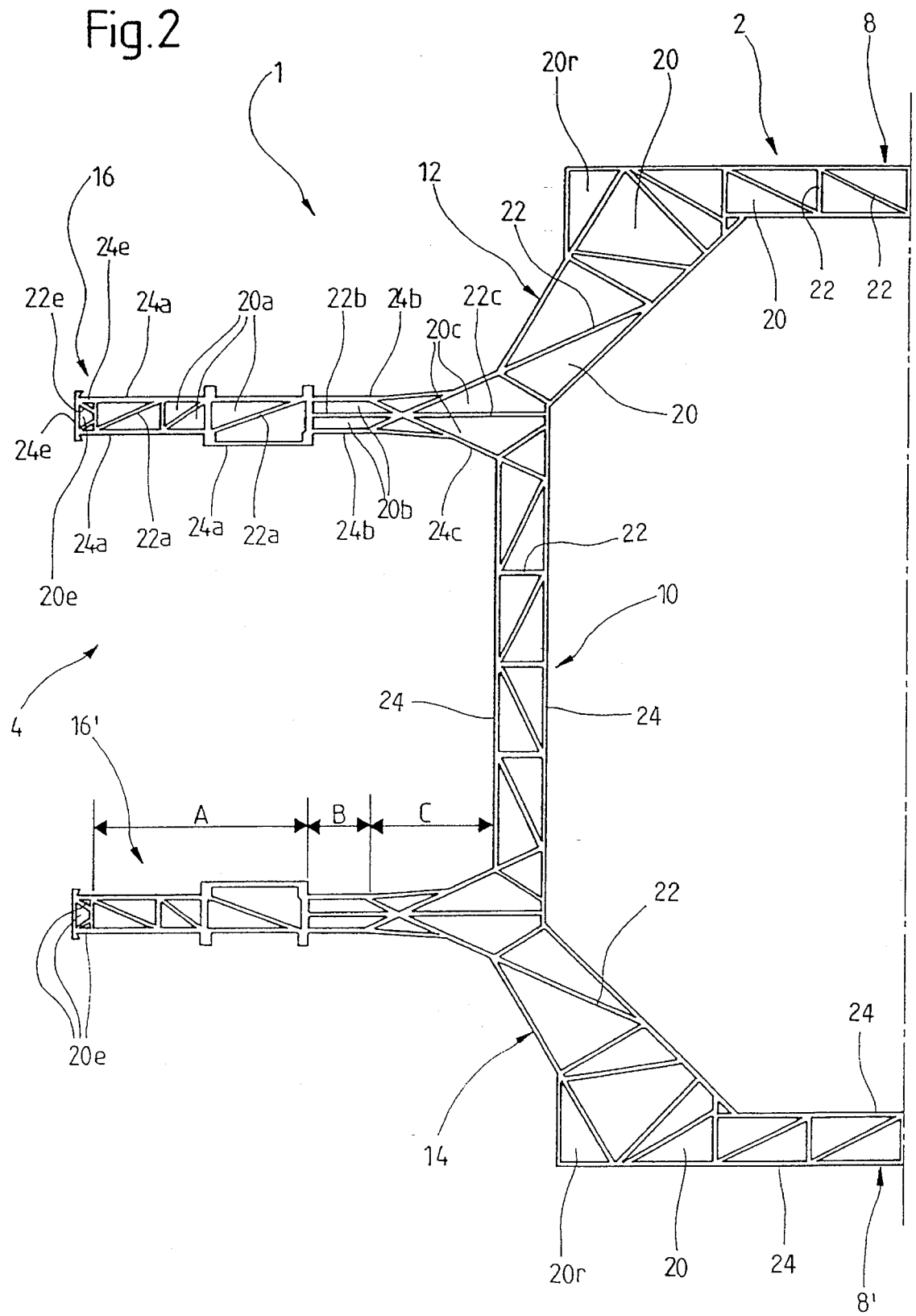

CHASSIS FOR VEHICLES NOTABLY FOR MOTOR VEHICLES

FIELD OF THE INVENTION

The invention concerns a chassis for vehicles, notably for motor vehicles, and more particularly, a unitary chassis having a configuration that may be obtained by extrusion along the yaw axis of the vehicle.

DESCRIPTION OF THE PRIOR ART

In the beginning, motor vehicles comprised a chassis formed by two side members connected by means of two welded cross members and a welded centre bracing. The side members extended beyond the cross members to form a shaft at the front and at the rear.

This type of chassis has numerous disadvantages due in particular to its great weight which requires significant energy to set it into motion and its great rigidity which makes the vehicle dangerous in the event of a collision.

These disadvantages subsequently led to the development of a new type of vehicle in which the chassis and the body are combined. This chassis-body assembly, which is still used today, is called a monoshell or self-supporting body, and includes a chassis-frame formed of a certain number of elements of pressed sheet metal welded together and a superstructure formed in the same manner and assembled either in a rigid or elastic way on the chassis-frame. Although this type of chassis offers a good compromise between lightness and rigidity, giving it advantageous safety features, it has, however, a large number of pieces that have to be assembled during numerous operations which, even if they are performed by robots, make the manufacturing costs of the chassis-frame high. This is why research is constantly carried out to provide the public with a simple motor vehicle chassis with increased safety features.

SUMMARY OF THE INVENTION

A purpose of the invention is thus to overcome the disadvantages of the above-mentioned prior art, by providing a vehicle chassis, with a structure such that it can be formed in a unitary piece and in a reduced number of operations whilst also offering safety and lightness characteristics compatible with the current requirements of the market and without having a prohibitive cost price.

The invention thus concerns a chassis for vehicles, notably motor vehicles, characterized in that it includes a rigid base frame and two absorption zones at the front and the rear associated with said frame and in that said frame and said absorption zones have a cell-like unitary structure.

Thus, the chassis can be formed in an economical way without assembly operations such as welding or bolting. Further, the cell-like structure of the chassis enables the desired mechanical characteristics to be easily imparted to its different parts. In particular, it is easy, firstly, to reinforce the base frame to enable it to maintain its shape in case of shocks and to give it the necessary torsion and flexion rigidity and, secondly, to make the absorption zone progressively able to be deformed in case of shocks to absorb the energy produced by the latter.

According to a characteristic of the invention, the chassis is formed of a material which is extruded along the yaw axis of the vehicle.

Other characteristics and advantages of the invention will become clear upon reading the detailed description of an embodiment of the invention given below purely by way of illustrative and non-limitative example.

BRIEF DESCRIPTION OF THE DRAWINGS

FIG. 2 is a semi-planar view of the chassis of FIG. 1.

DESCRIPTION OF PREFERRED EMBODIMENT

Figure 1:
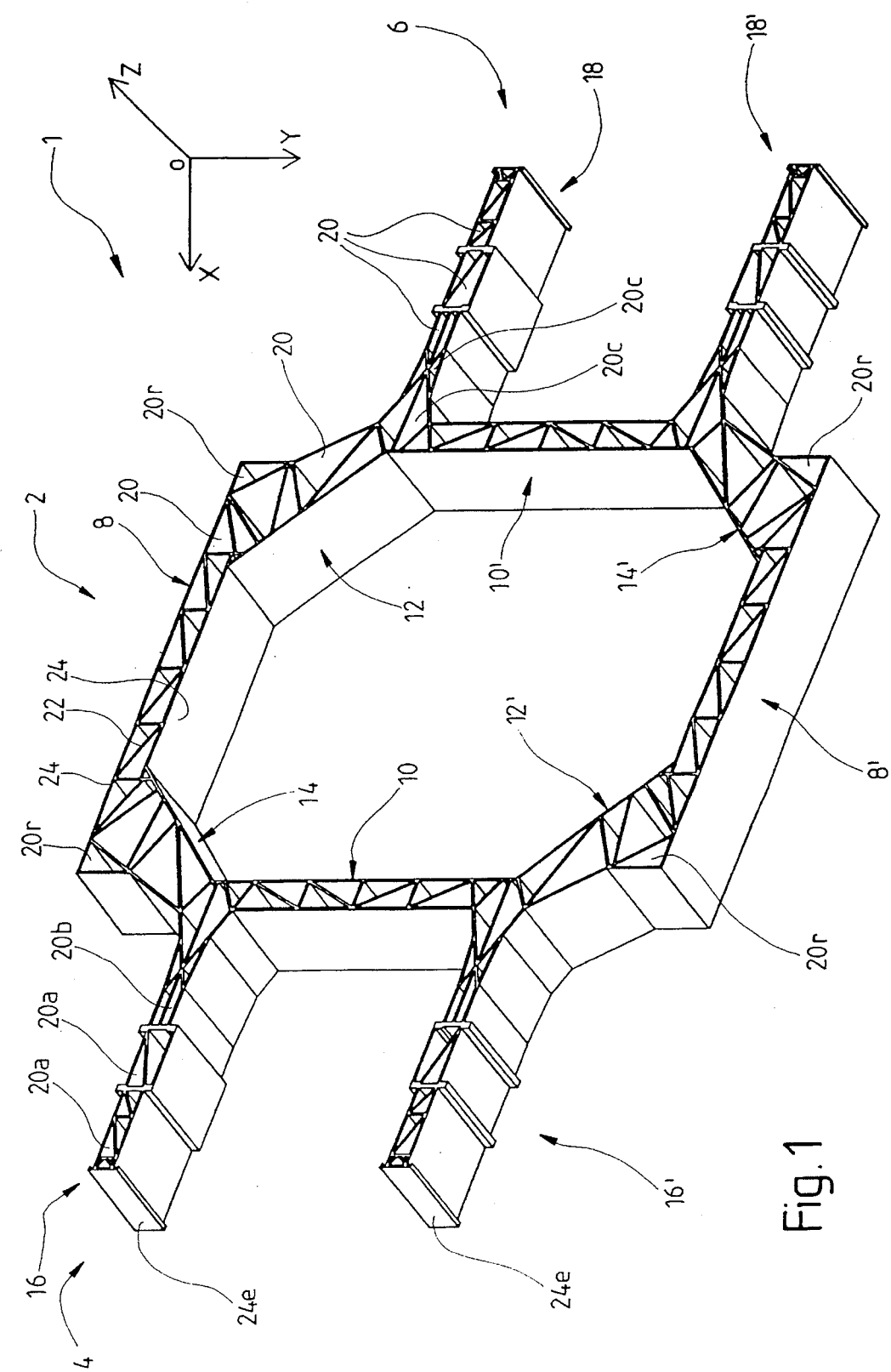
FIG. 1 is a perspective view showing a chassis according to the invention.

FIG. 1 shows a chassis according to the invention, designated by the general numerical reference 1 and intended, in the example illustrated, to equip a motor vehicle.

Chassis 1 comprises a rigid base frame 2 and two absorption zones 4, 6 respectively at the front and rear which extend substantially parallel to the longitudinal axis OX of the chassis or rolling axis. Base frame 2 is intended to support the passenger space (not shown) of the motor vehicle and to delimit in a plane parallel to the road surface a rigid structure inside which the occupants of the vehicle are situated. The two absorption zones 4 and 6 are intended, on the one hand to support the functional elements of the vehicle and, on the other hand, in the event of impact, to absorb the energy by deformation of their constituent organs, to ensure the safety of the occupants of the vehicle.

In the following description pitching axis will be defined to mean the cross axis OY of the chassis and yaw axis will be defined to mean the axis OZ perpendicular to the longitudinal axis OX and cross axis OY.

In the example described, base frame 2 has a generally octagonal form and comprises eight beams 8, 8', 10, 10', 12, 12', and 14, 14', in parallel pairs extending in a same plane. Beams 8, 8' extend parallel to the rolling axis, beams 10, 10' extend parallel to the pitching axis and beams 12, 12' and 14, 14' extend substantially at an angle of 45° in relation to the rolling axis or pitching axis.

Absorption zones 4 and 6 each comprise two side members 16, 16' and 18, 18' in parallel pairs which extend parallel to beams 8, 8' of frame 2 starting from the junction of beams 10 and 10' with beams 14, 12' and 12, 14' respectively.

According to the invention, base frame 2 and absorption zones 4 and 6 forming chassis 1 exhibit a structure comprising a plurality of cells designated by the general reference 20. This cell-like chassis structure is extruded in a single or monolithic piece along the yaw axis OZ of the chassis and through an extruder die plate whose shape is complementary to that of the chassis.

Cells 20 forming the beams of frame 2 are delimited by the external walls 24 and internal walls 22 which are placed geometrically in such a way that the torsion rigidity and flexion rigidity of chassis 1 are high in relation to rolling axis OX and pitching axis OY, notably to give to the vehicle intended to be equipped with chassis 1 safe and comfortable driving characteristics.

Walls 22 and 24 of the cells forming side members 16, 16', 18, 18' are arranged in such a way that the side members exhibit an ability to be deformed which decreases the closer they are to base frame 2.

Referring particularly to FIG. 2 it can be seen for example that side member 16 can be divided into three zones A, B, C having cells 20 of different shapes and dimensions providing the zones of the side member with the particular mechanical characteristics required for each of such zones.

More precisely, zone A comprises a succession of pairs of cells 20a each having a section in the form of a right-angle triangle. The hypotenuse of these triangles forms an internal wall 22a common to the cells of each pair and their long side, which extends substantially parallel to the rolling axis of the chassis, forms the external walls 24a of the cells of each pair. The configuration of cells 20a of zone A enables them, in the event of impact, to become deformed with a resistance to deformation which increases the closer they are to frame 2 and, consequently enables them to absorb a maximum quantity of energy produced by the impact.

Zone B comprises at least two cells 20b, in a general trapezoidal form, which are juxtaposed. These cells 20b have a common wall 22b which extends substantially parallel to the rolling axis and two other external walls 24b which are also parallel to this axis. The geometry of the zone B cells is intended in particular to give this zone great flexion rigidity in relation to the pitching axis.

Zone C comprises cells 20c, in a general triangular form, whose external walls 24c extend into the continuation of external walls 24b opening out progressively towards frame 2. The two cells 20c which are closest to the frame include a common internal wall 22c which extends substantially parallel to the rolling axis and into the continuation of internal wall 22b of cells 20b of zone B. This configuration of connecting zone C enables, when required, a satisfactory distribution to be ensured of the stresses sustained by side members 16, 16', 18, 18' throughout the frame.

It will also be noted that each side member 16, 16', 18, 18' also comprises, at its free end, cells 20 separated notably by one or more internal walls 22e whose position is such that they tend to push back external walls 24e of the side member when the latter receives a shock the direction of which is parallel to the rolling axis. Thus, a general deformation of the side member is favoured in the event of impact so that the energy of the impact may be favourably dissipated. In the example described, three cells 20e are separated by an internal wall 22e substantially in the form of a V whose point is directed towards frame 2 and two external walls 24e parallel to the rolling axis and two other parallel walls respectively internal and external of end 24e which is perpendicular to the rolling axis. In this regard it will be noted that end external wall 24e end may advantageously be used as an area for fixing a bumper (not shown).

More generally, it will be noted that by working at the same time on the length of the different internal and external walls and/or on the angles which these walls form with the rolling axis, one can easily vary the mechanical characteristics of the chassis and thus achieve the desired mechanical characteristics.

According to another characteristic of the invention, the structure of frame 2 is also reinforced by the particular positioning of the internal and external walls of cells 20 of beams 12, 12', 14, 14'. In particular, beams 12, 12', 14, 14' are oriented at an angle, of 45° in the example described, in relation to the rolling axis of the chassis in order to enable the effective transmission of the stresses coming from side members 16, 16', 18, 18' to beams 8, 8'.

In an advantageous manner, chassis 1 also includes means for receiving and/or fixing the functional elements of the vehicle formed in one piece with frame 2 and side members 16, 16', 18, 18'.

In particular, frame 2 comprises four cells 20r distributed at the four ends of beams 8, 8'. Cells 20r are respectively intended for fixing, notably by having embedding therein, roll bars 26 (FIG. 2) enabling the passenger space to avoid being crushed in the event that the vehicle overturns. Further, side members 16, 16', 18, 18' each include at the end of zone A closest to frame 2, a pair of cells 20a specifically reinforced for the fixing of the suspension and wheels of the vehicle.

Chassis 1 preferably has a height of at least 150 mm. The empty space inside rigid base frame 2 may for example, after installation of the floor boards, be advantageously used for storing batteries in the case of an electric motor vehicle.

It should be noted that a chassis of this type, in which the ends of side members 16 and 18 are connected by cross members (not shown) to the ends of side members 16' and 18', is within the scope of the invention.

Chassis 1 is preferably formed of an aluminium alloy. The aluminium alloys are well suited to extrusion and enable an advantageous compromise to be reached between the rigidity and lightness of the chassis.

In the example which has just been described, the cells have a triangular or quadrilateral section, but obviously other forms of section may be envisaged by a man skilled in the art.

In practice, a chassis according to the invention may be obtained by cutting slices, in a plane perpendicular to the extrusion axis, of an extruded profile having the internal and external contour of the chassis shown in the drawings.

We claim:

1. A chassis for a motor vehicle, said chassis consisting of a monolithic structure comprising a rigid base frame with front and rear impact energy absorption zones at the front and the rear of the base frame, respectively, the impact energy absorption zones extending parallel to a rolling axis of the chassis, said monolithic structure comprising an open framework of cells bounded only by walls extending parallel to a yaw axis of the chassis.

2. A chassis according to claim 1, formed by extruding a material in a direction parallel to the yaw axis of said chassis.

3. A chassis according to claim 2, wherein the front and rear impact energy absorption zones each comprise two side members connected to the base frame and extending parallel to the rolling axis of said chassis.

4. A chassis according to claim 1 wherein the front and rear impact energy absorption zones each comprise two side members connected to the base frame and extending parallel to the rolling axis of said chassis.

5. A chassis according to claim 4, wherein the cells forming the base frame and the side members have walls oriented to impart torsion and flexion rigidity to said chassis.

6. A chassis according to claim 4, wherein the side members have cells with the walls arranged in such a way that said side members exhibit an ability to be deformed which decreases the closer they are to the base frame.

7. A chassis according to claim 1, wherein the cells have sections selected from the group of sections consisting of triangular and quadrilateral sections.

8. A chassis according to claim 1, wherein the base frame has a general octagonal form.

9. A chassis according to claim 1, made of aluminum alloy.

10. A chassis for a motor vehicle, said chassis comprising a rigid base frame and front and rear absorption zones extending along a rolling axis of the chassis at the front and the rear of said frame, said frame and said absorption zones having as a whole a unitary structure in the form of a plurality of cells having walls parallel to a yaw axis of said chassis, the front and rear absorption zones each comprising two side members connected to the base frame and extending parallel to the rolling axis of said chassis, said side members including connecting zones connecting said side members with the base frame, each connecting zone comprising at least two cells having a common wall and diverging walls, said common wall extending substantially parallel to the rolling axis of the chassis and the diverging walls opening out towards the base frame.

11. A chassis for a motor vehicle, said chassis comprising a rigid base frame and two impact energy absorption zones at the front and rear of said base frame and extending parallel to a rolling axis of the chassis, said base frame and said absorption zones consisting of a plurality of cells bounded only by walls extending parallel to a yaw axis of said chassis, said absorption zones comprising first portions having a plurality of pairs of cells having sections in the form of right-angle triangles, each pair of cells having a common wall comprising the hypotenuse to a pair of right-angle triangles and each cell of each pair of cells having a side wall extending parallel to a rolling axis of the chassis.

12. A chassis as claimed in claim 11 wherein said absorption zones comprise second portions comprising a pair of cells having sections of generally trapezoidal form, the cells of the pair of cells having sections of generally trapezoidal form having a common wall and an external wall all extending parallel to the rolling axis of the chassis.

13. A chassis as claimed in claim 12 wherein said absorption zones comprise third portions having pairs of cells of generally triangular section with external walls opening out toward said base frame.

* * * * *